United States Patent
Yuzhakov

(10) Patent No.: US 10,191,911 B2
(45) Date of Patent: Jan. 29, 2019

(54) PERMANENT WEBSITE HOSTING ON MOBILE DEVICES

(71) Applicant: Plesk International GmbH, Schaffhausen (CH)

(72) Inventor: Alexey Yuzhakov, Novosibirsk (RU)

(73) Assignee: Plesk International GmbH, Schaffhausen (CH)

( * ) Notice: Subject to any disclaimer, the term of this patent is extended or adjusted under 35 U.S.C. 154(b) by 143 days.

(21) Appl. No.: 15/607,450

(22) Filed: May 27, 2017

(65) Prior Publication Data

US 2018/0341661 A1 Nov. 29, 2018

(51) Int. Cl.
*G06F 17/30* (2006.01)
*H04W 88/04* (2009.01)
*H04L 29/12* (2006.01)

(52) U.S. Cl.
CPC .... *G06F 17/30147* (2013.01); *H04L 61/2007* (2013.01); *H04W 88/04* (2013.01); *G06F 2212/154* (2013.01); *G06F 2212/163* (2013.01)

(58) Field of Classification Search
CPC .................................................. G06F 17/30147
USPC ........................................................ 709/203
See application file for complete search history.

(56) References Cited

U.S. PATENT DOCUMENTS

| | | | | |
|---|---|---|---|---|
| 5,371,890 A | * | 12/1994 | Bozman | G06F 9/543 709/215 |
| 5,987,611 A | * | 11/1999 | Freund | G06F 21/552 726/4 |
| 8,379,028 B1 | * | 2/2013 | Mullins | G06T 13/40 345/419 |
| 9,778,964 B1 | * | 10/2017 | Mowatt | G06F 9/542 |
| 10,079,854 B1 | * | 9/2018 | Scott | H04L 63/1466 |
| 2006/0149813 A1 | * | 7/2006 | Janik | H04L 12/2898 709/203 |
| 2006/0259819 A1 | * | 11/2006 | Connor | G06F 21/10 714/38.14 |
| 2007/0174845 A1 | * | 7/2007 | Guthrie | H04L 29/06 719/318 |
| 2007/0204265 A1 | * | 8/2007 | Oshins | G06F 9/45558 718/1 |
| 2007/0244990 A1 | * | 10/2007 | Wells | G06F 17/30896 709/218 |
| 2008/0140897 A1 | * | 6/2008 | Ganguly | G06F 12/1027 710/268 |

(Continued)

*Primary Examiner* — Ondrej C Vostal
(74) *Attorney, Agent, or Firm* — Bardmesser Law Group

(57) ABSTRACT

A system for hosting a website, including a mobile device having an operating system and a supervisory component installed thereon; a webserver application running on the mobile device under control of the supervisory component; a control panel application running on the mobile device, the control application configured to set parameters of the webserver application. The webserver application is in a sleep mode and wakes up in response to a command from the supervisory component. The webserver component generates a website using documents and files of other applications that are stored on the mobile device. The supervisory component wakes the webserver application in response to an HTTP request received from a network port when the mobile device is connected to a mobile network. The webserver application is given permission to access the documents and files of the other applications through the control panel.

4 Claims, 8 Drawing Sheets

(56) References Cited

U.S. PATENT DOCUMENTS

| | | | |
|---|---|---|---|
| 2010/0064154 A1* | 3/2010 | King | H04W 52/0251 |
| | | | 713/320 |
| 2013/0018490 A1* | 1/2013 | Caffrey | G05B 15/02 |
| | | | 700/83 |
| 2013/0212288 A1* | 8/2013 | Jakubowski | H04L 67/08 |
| | | | 709/228 |
| 2013/0297894 A1* | 11/2013 | Cohen | G06F 3/0679 |
| | | | 711/154 |
| 2014/0026231 A1* | 1/2014 | Barak | G06F 9/45558 |
| | | | 726/29 |
| 2015/0074432 A1* | 3/2015 | Winter | G06F 1/3209 |
| | | | 713/300 |
| 2016/0119400 A1* | 4/2016 | Elliott | H04L 67/02 |
| | | | 709/203 |
| 2016/0246586 A1* | 8/2016 | Madanapalli | G06F 8/65 |
| 2016/0314299 A1* | 10/2016 | Almer | G06F 21/6218 |
| 2017/0149682 A1* | 5/2017 | Dapoz | G06F 9/00 |
| 2017/0182283 A1* | 6/2017 | Palmateer | A61M 21/02 |
| 2017/0187640 A1* | 6/2017 | Vasudevan | H04L 47/50 |
| 2018/0115550 A1* | 4/2018 | Sapir | G06F 21/6218 |
| 2018/0121306 A1* | 5/2018 | Srinivasan | G06F 1/266 |
| 2018/0124210 A1* | 5/2018 | Mosko | H04L 67/06 |

\* cited by examiner

PERMANENT WEBSITE HOSTING ON MOBILE DEVICES

BACKGROUND OF THE INVENTION

Field of the Invention

The present invention is related to website hosting, and more particularly, to permanent hosting of websites on a mobile device.

Description of the Related Art

Currently, the conventional practice is to host websites and other similar applications on static hardware, such as on a hardware node in a datacenter, or, less common today, on a personal computer or desktop in a private home. The vast majority of the tools that have been developed for hosting relate primarily to the datacenter hosting service providers.

On the other hand, there are certain advantages to hosting a website on a mobile device, particularly as device capability improves over time, and network capacity and reliability also improve.

SUMMARY OF THE INVENTION

The present invention is related to permanent hosting of websites on a mobile device, that substantially obviates one or more of the disadvantages of the related art.

In one aspect of the invention, there is provided a system for hosting a website, including a mobile device having an operating system and a supervisory component installed thereon; a webserver application running on the mobile device under control of the supervisory component; a control panel application running on the mobile device, the control application configured to set parameters of the webserver application. The webserver application is in a sleep mode and wakes up in response to a command from the supervisory component. The webserver component generates a website using documents and files of other applications that are stored on the mobile device. The supervisory component wakes the webserver application in response to an HTTP request received from a network port when the mobile device is connected to a mobile network. The webserver application is given permission to access the documents and files of the other applications through the control panel.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
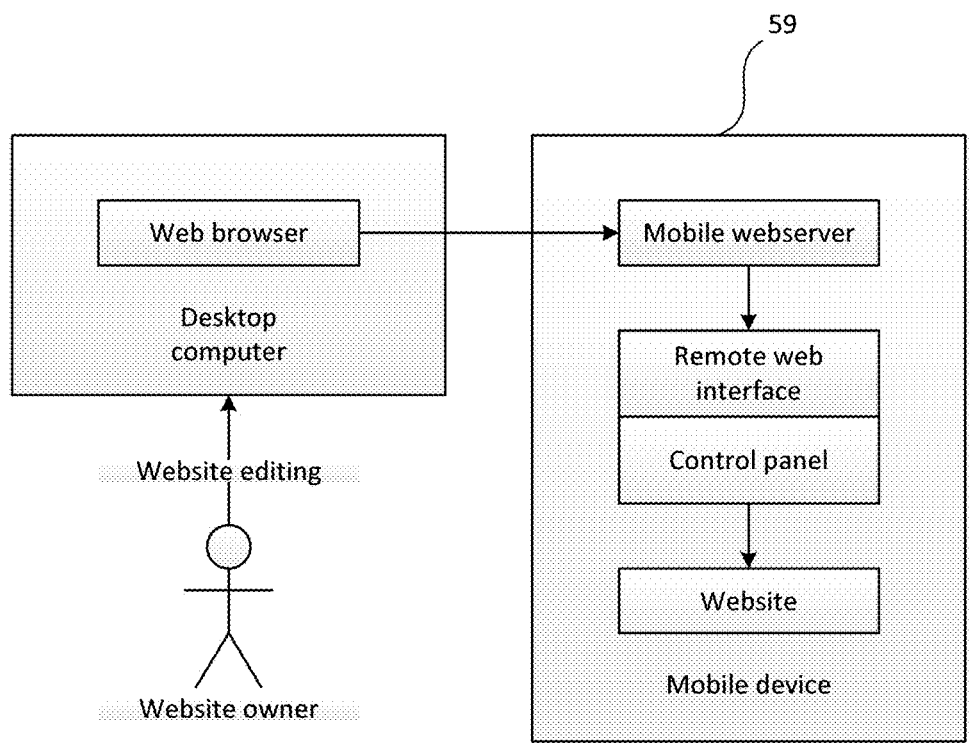
FIG. 1 shows how a website owner can manage or edit his websites remotely using a desktop computer.

Reference will now be made in detail to the preferred embodiments of the present invention, examples of which are illustrated in the accompanying drawings.

As noted earlier, there are certain advantages to hosting a website on a mobile device. For example, the user typically already pays for not just voice use of the mobile device, but for data as well. Thus, hosting of the website on a mobile phone might not incur additional charges, since the data plan that the user has might already cover the traffic.

Also, the user can easily add or remove additional features that, if they were purchased from a hosting service provider, would cost additional money. Since the user directly controls the device in his hand, he can more finely and more precisely decide which features he wants, or doesn't want, and which features he wants to pay for, or doesn't want to pay for. This can work both in the direction of a user wanting to host a fairly complex, feature-rich, website on his mobile device, as well as in the direction of a user wanting to host only a very basic website, with none of the "bells and whistles" that a hosting service provider might offer as a standard plan.

Additionally, a user who wants to know when his website is being accessed can be notified immediately, since the server application is running on the device in his hand or in his pocket. This is in contrast with a conventional approach, where the user would have to request this data from a server on which the website is hosted.

Also, any content that the user wishes to make available to the public (either to any anonymous user accessing the website, or to a specific set of authorized users) can be edited more easily, and edited on the fly. For example, adding or removing photos or other types of images or videos from being accessed by the public is easier, since it does not require uploading the content to a server.

Additionally, in the conventional case, the user needs to push his data to the server (for example, in the case of Instagram, the user takes a photo on his device, and then needs to push the photo to the server). Then, other users need to pull the data from the server. In the present case, all the user needs to do is give access to the photos on his phone to specific users (or to any requestor). Then, those other authorized users can directly do a pull of the selected photo from the mobile device (or more generally, can do a pull of the designated content, such as text, formatted text, video, images, as well as structured content such as forums and blogs and bulletin boards).

Conventional hosting typically uses static IP addresses that permit tying a DNS name to the IP address. Mobile devices that use IPv4 protocol typically do not have a static public IP address. The mobile service provider allocates a dynamic IP address to the mobile device, which can change fairly frequently. One possible solution is the use of IPv6, the next generation internet protocol (or a later version that supports IPv6 address scheme). However, in the present invention:

(1) The mobile operator allocates a permanent IPv6 (or later) address to the mobile device;

(2) The mobile operator provides access to the IPv6 address of the user from the Internet, on a permanent basis;

(3) The mobile operator informs the user about the allocated address;

(4) The user (himself, or with someone's assistance) ensures a tie-in of the address to the domain name of the website. This is usually done through a domain name registrar (i.e., a seller of domain names);

(5) The last step can also be done automatically, if the user informs the mobile operator which domain name(s) will be hosted on his device.

Thus, in order to implement the concept, the mobile device needs to have a server software module installed on it. Also, some sort of content management software/application needs to be installed, depending on which features the user wants his website to have. Also, the server application needs to run in the background, rather than in the foreground—even when the phone is in a standby mode. The user also needs a control panel application to manage the web server. Note that the control panel can be either in the background or in the foreground, or the user can toggle them between background and foreground.

The server needs to listen to a particular port, typically port 80, using a socket. Note that this is not a typical function of mobile device applications.

Another issue to consider that is not present in a conventional hosting environment is battery life. Typically, the server applications to be running in the background all the time. This can have a significant impact on battery life. The mobile OS can force an application into a background mode (essentially, put it to sleep) when there are no active network connections. When an active connection to the webserver appears, the mobile OS needs to wake up the webserver application, so that it can respond to the request. Thus, all that needs to be active all the time is a monitor of incoming connection requests (which can be part of the OS, a driver, part of the hypervisor or a similar supervisory component), which can than wake the required application.

In a conventional mobile device, different applications are typically isolated from each other, either using a sandbox, or some variation of a virtual machine. Thus, if a user wants to give the web server access to images and photographs that he took using another application of the mobile device, he needs to give the web server access to these images, otherwise they would be unavailable. Automatic (or permission-driven) access to data stored on the mobile device, as well as access to devices such as GPS, camera, etc. permits formation of automatically generated websites and different web services, such as automatically generated photo-albums, contacts that permit transmitting the contact info to another device automatically, transfer them to another device, and so on.

Additionally, during those times when the mobile device is not connected to the mobile network for whatever reason, the provider needs to display some message to users trying to access the website, in other words, something along the lines of "service temporarily unavailable".

Thus, the paradigm proposed herein has the user's website(s) is/are physically located on a mobile device, i.e., website files and software are located on the device.

The communications provider allocates a permanent IPv6 address to the user's mobile device. IPv6 is chosen due to a shortage of IPv4 addresses and because there are lots of devices requiring such addresses.

The communications provider provides a permanent access to the user's IP address via the Internet.

The communications provider informs the user about the IP address that has been allocated to them.

The user, by themselves or through someone, binds the IP address to the website domain name. Usually, such binding can be done by the domain name registrar (seller).

The user presents the website content to visitors by executing a special software that is run on the mobile device (a mobile webserver).

The communications provider will display a placeholder page that says the website is inaccessible in case the user's mobile device is disconnected (switched off or is outside the coverage). In other words, when calling someone who is outside the coverage area, the user will get a corresponding message. In this case, the mobile provider can use the same approach for websites.

Servicing a website on a mobile device does not require extra spending, since the contract with the communications provider also covers both incoming and outgoing Internet traffic.

The user's website does not have to be exclusively a mobile website, it may be a general purpose website, i.e. can be viewed from desktop devices as well.

The website owner can be uniquely identified by matching the allocated IP address with the International Mobile Equipment Identity (IMEI) and the user's communications provider contract.

The mobile webserver operates in background mode. When there are no active network connections, the mobile device OS can set the webserver application into the sleep mode to save power. When an active network connection is detected, the mobile device OS wakes the application and sets it into the active mode. When there are no queries on the IP address bound to the device, the mobile webserver is in the sleep mode and does not consume battery power.

The user does not usually need to interact directly with the mobile webserver.

The website is administered via a special software (the website Control Panel).

The Control Panel is an interactive mobile app (directly interacting with the user). The Control Panel comprises a set of tools used to edit the website or its fragments, specific content or portions of the content, including data and/or metadata. Some functions can be performed by external applications, under the condition that the edited content is returned back to the Control Panel (e.g., website images can be edited externally).

The Control Panel allows the website 106 to be administered remotely. Thus, the website owner does not have to manage it on the mobile device 59 containing the website 106 exclusively, since he can do it via any other device, including other mobile devices, desktop or laptop computers, see FIG. 1.

The website 106 is administered remotely via a web-based app located on the mobile webserver 102 using a separate port in order not to obstruct other websites 106, see FIG. 1.

The user's website(s) 106 is/are located in the user data bound to the Control Panel application 106, and thus inaccessible by other applications, except the mobile webserver 102.

The mobile webserver 102 has access to the user's websites 106 to present them to visitors. Different mobile OS's may have their security policies that isolate user data segments of various apps from one another. For the mobile webserver 102 to operate properly, it must be given access to website 106 files that are bound to the Control Panel application 106.

A typical website 106 is a set of files stored in a file system. The mobile web server 102 may either send files (static files) directly via the HTTP/HTTPS protocol, or interpret files and further generate dynamic content. In other words, the mobile device 59 will host not only static websites, but also dynamic ones, the content of which is not statically stored to be presented to viewers, but are generated "on the go".

The mobile webserver 102 has access to media data stored on the mobile device 59. The mobile OS may restrict access to user data. If this is the case, the user may allow or prohibit access to some categories of data personally (e.g., the mobile OS can be set up to grant permission to access photos, etc. to the mobile webserver application 102).

The access to the user's media data is managed via the mobile OS built-in means, or via the Control Panel application 106.

The Control Panel app 106 allows to generate websites 106 from user's media data (photos, videos, music, etc.) both automatically and semi-automatically, i.e. without user's participation or with minimum participation on their part.

The following website types can be generated automatically or semi-automatically: a personal webpage, a photo gallery, a V-log, a blog, a user location map. This list can be further expanded. The websites 106 that can be automatically or semi-automatically generated are based on user-generated content and hardware capabilities and/or properties of the given mobile device 59. For example, if the user has a collection of photos with GPS location tags, a photo gallery-type website may be generated that will also include a photo location map. From there on, the website 106 will be updated automatically as soon as new photos are added to the collection.

The Control Panel app 106 provides a complete range of website 106 administering and editing functions, such as uploading data from external sources, file editing, website 106 structuring, access permissions, etc. The control panel 106 can also be a "thin client" that has limited functionality compared to a "bigger" control panel that is executed on a server. Still, website 106 hosting can be administered via a small touchscreen, and expanding the application functionality is only a matter of time.

The Control Panel app 106 and the mobile webserver 102 operate independently, i.e. if the mobile webserver 102 is running, the websites 106 will work, even if the Control Panel 106 is not.

The Control Panel app 106 also controls the mobile webserver 102, namely allowing to switch it on/off, and configure it (website selection, processing and presenting methods).

The mobile webserver 102 can notify the user (the owner of the mobile device 59) of the website 106 visits via a mobile OS built-in notification system and/or the Control Panel app 106 in real time. In the context of mobile hosting, the website 106 is operated on the mobile device 59, and its software (the mobile webserver 102 in particular) can immediately notify the owner of a website visit, since the client's web browser is physically connected to the mobile webserver 102 that is running on the mobile device 59. As an example, in the case of running an online shop or a traditional shop, such notifications might help the owner to guide the visitor's actions, promptly provide feedback, answer a question, or otherwise act quickly in a situation that requires an immediate response.

Figure 2:
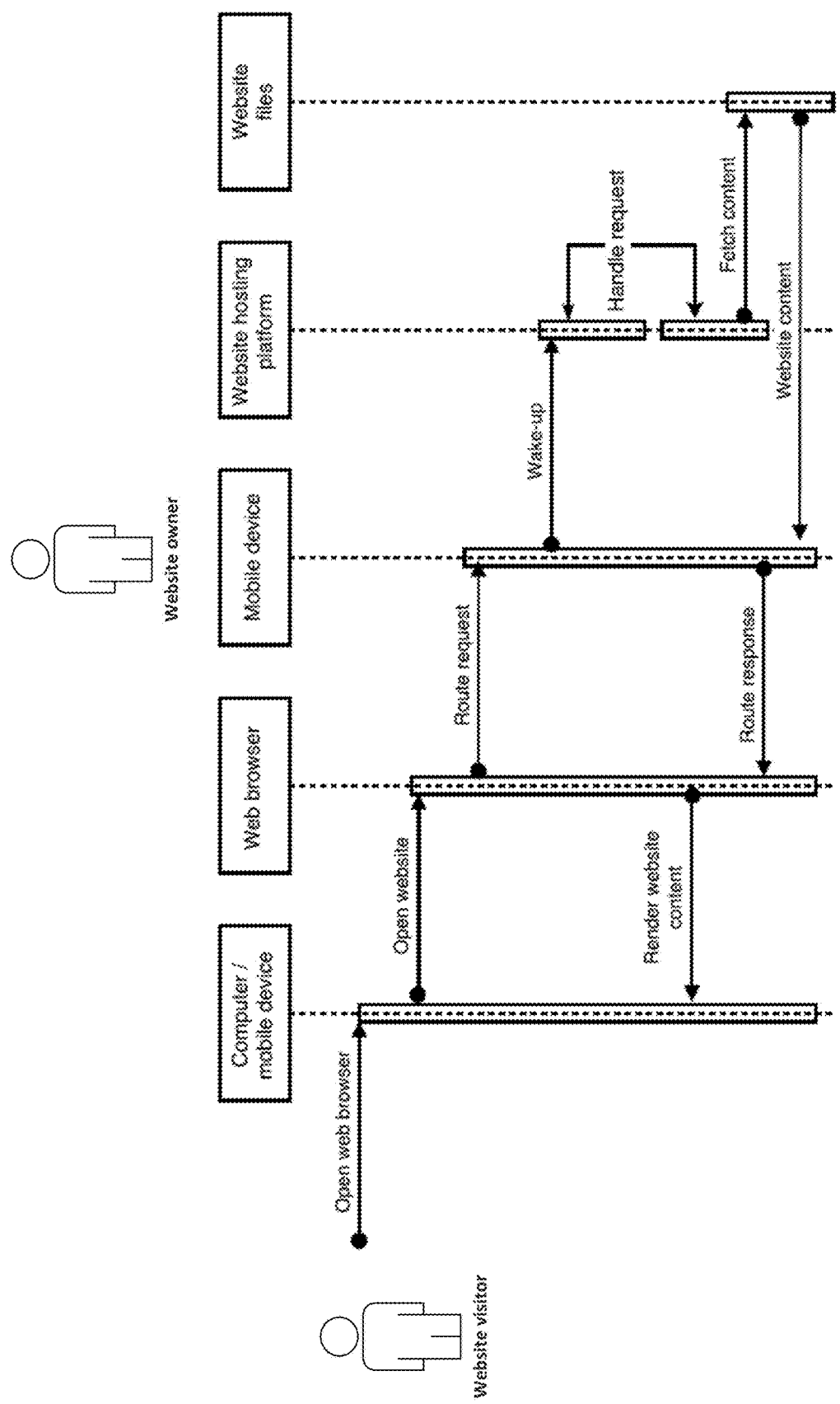
FIG. 2 illustrates the steps of processing a request to show a webpage and the response providing the webpage.

FIG. 2 illustrates the algorithm of accessing a website 106 on a mobile device 59. As shown in FIG. 2, a website visitor, using a browser open on his computer of mobile device 59, attempts to open a website 106. The web browser then routes the request to the website 106 to the mobile device 59, on which the server application 102 is running. The mobile device 59 then wakes up the website hosting platform on the mobile device 59, and handles the request. This may involve fetching content for the website 106, such as text, images, etc., which is stored as files on the mobile device 59. The website hosting platform then generates the response to the request. The mobile device 59 then routes the response to the browser that initiated the request. The browser then renders the website 106 and the content of the website 106 to the web site visitor.

Figure 3:
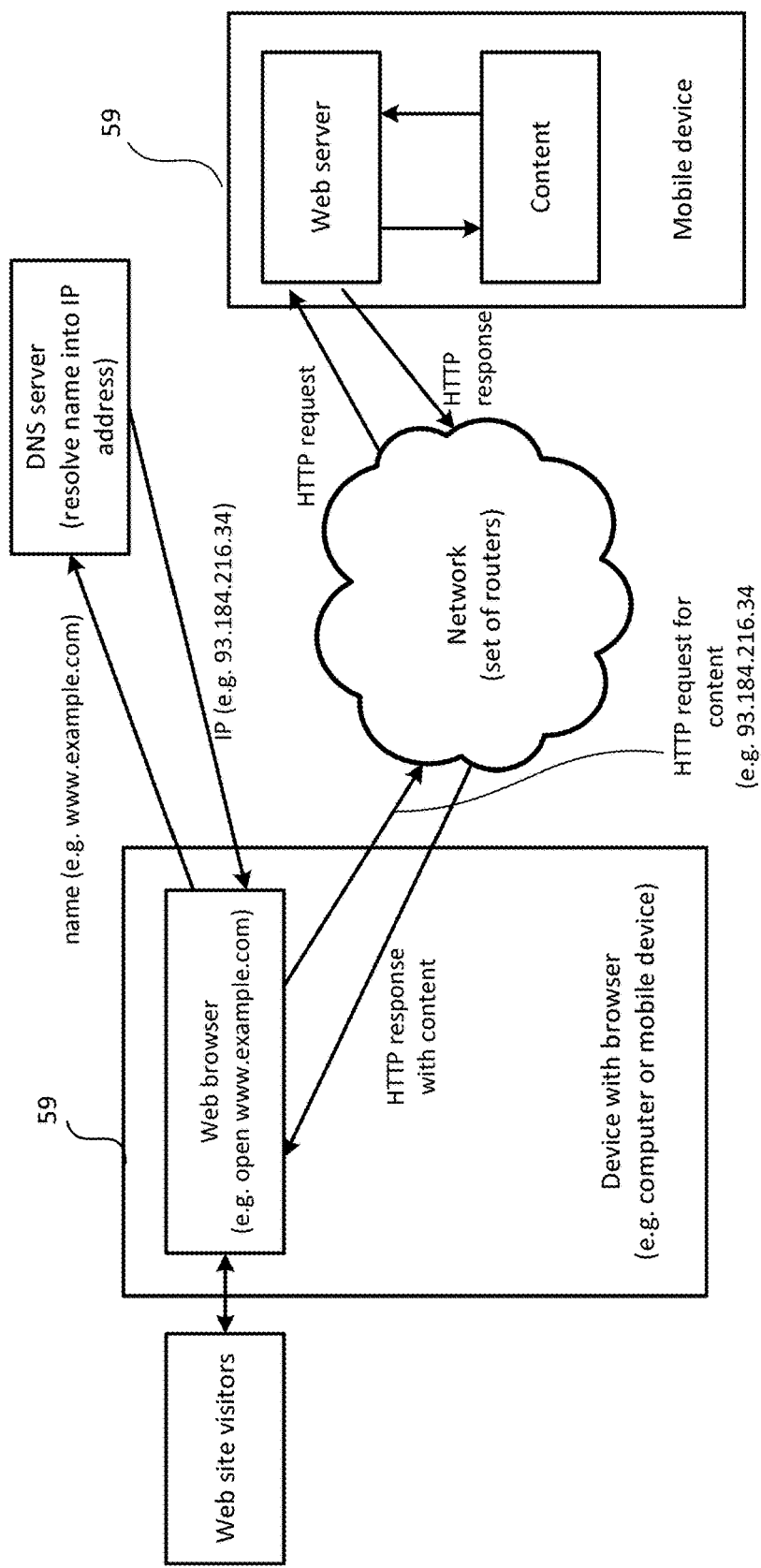
FIG. 3 shows underlying network communications in order to provide the contents of the mobile hosted website in response to the request to the visitor.

FIG. 3 illustrates the operation of providing the contents in response to the request to the visitor. As further shown in FIG. 3, the request, such as an HTTP request, is generated and sent to a specific IP address, in the example of the figure, 93.184.216.314. The request is routed through a network, such as the internet, and then reaches the web server running on the mobile device 59. If necessary, the web browser may need to contact a DNS server to resolve the URL into an IP address.

The webserver 102 running on the mobile device 59 generates the response, such as an HTTP response, and sends it back through the network to the requesting device, such as another computer or another mobile device 59.

Figure 4:
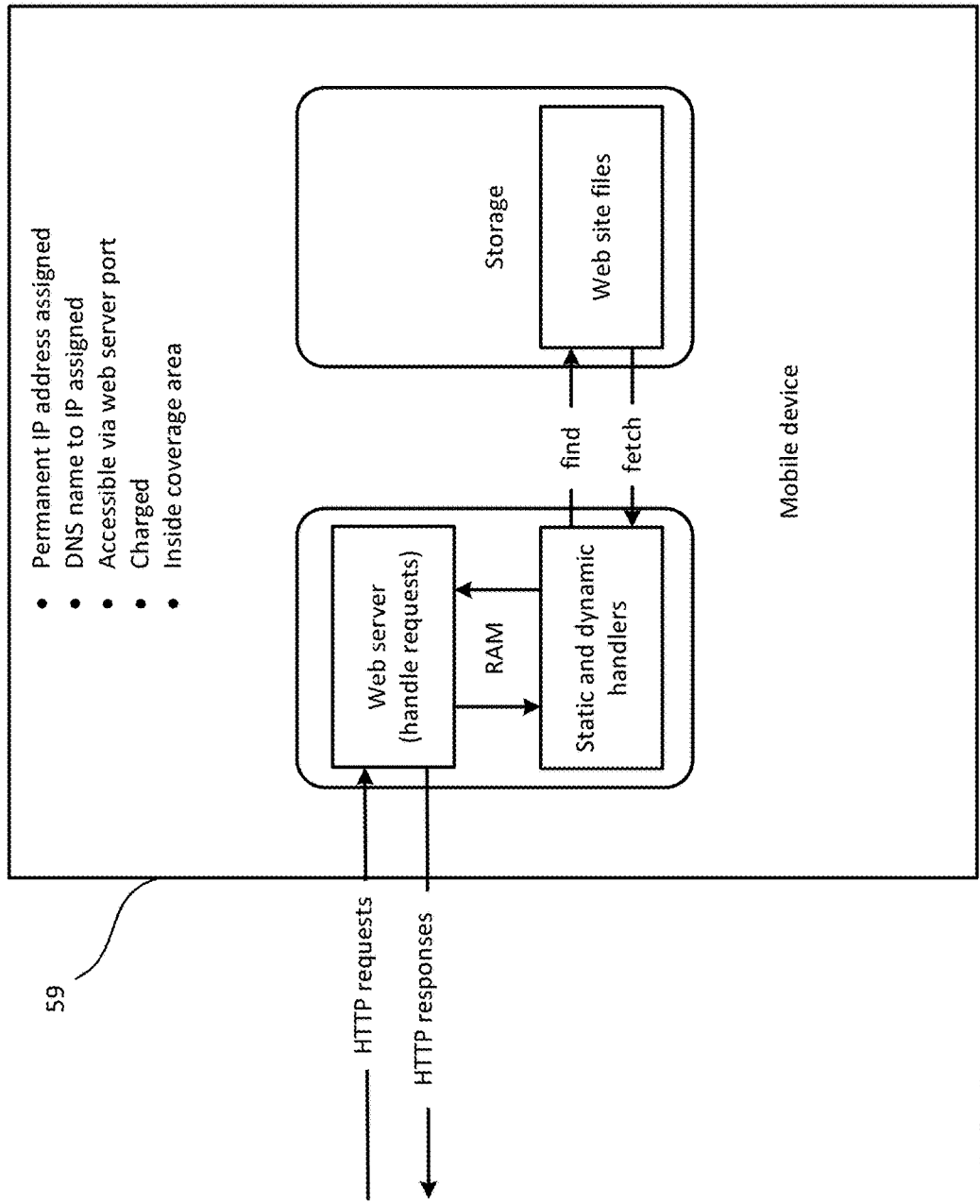
FIG. 4 is another illustration of the functionality needed on the mobile device in order to host a website.

FIG. 4 is another illustration of the functionality needed on the mobile device 59 in order to host a website 106. As shown in FIG. 4, in order to respond to HTTP requests, the mobile device 59 needs to have a permanent IP address assigned to it. The DNS server needs to know to resolve the DNS name to an IP address assigned to the server hosted on the mobile device 59. The server must be accessible using a webserver port (such as 110, 8080, or another port normally used for responding to HTTP requests). The mobile device 59 needs to be charged, and needs to be in an area that has mobile coverage.

Figure 5:
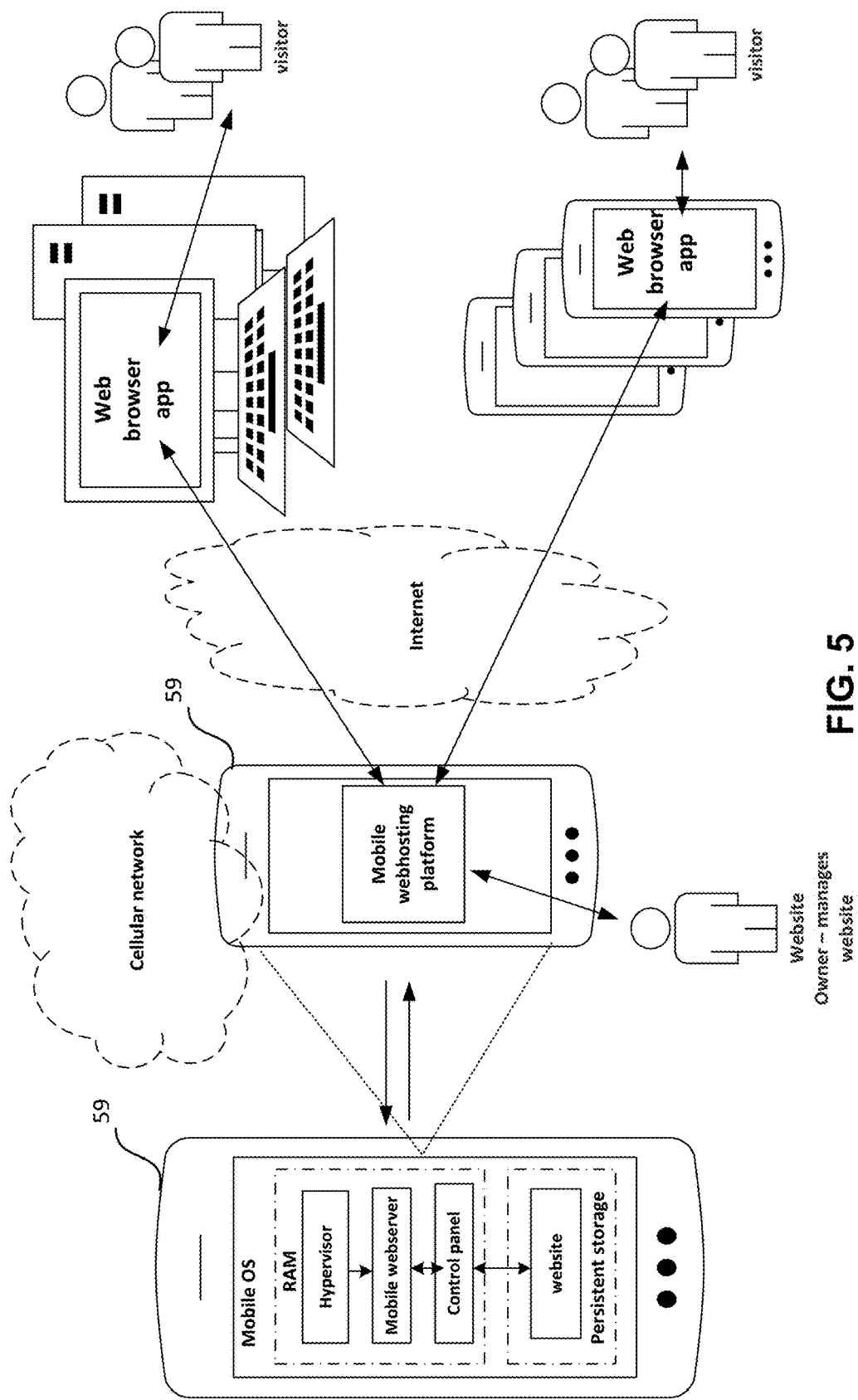
FIG. 5 is another high-level diagram of the concept discussed herein.

FIG. 5 is another illustration of the concept, where the mobile hosting platform on the device 59 includes a RAM, in which a hypervisor 510 or a similar supervisory component is running. The hypervisor manages the mobile webserver 102, which also interfaces to a control panel 106. Using the control panel 106, the user can manage the functionality of the website 106, which is typically stored in persistent storage.

Figure 6:
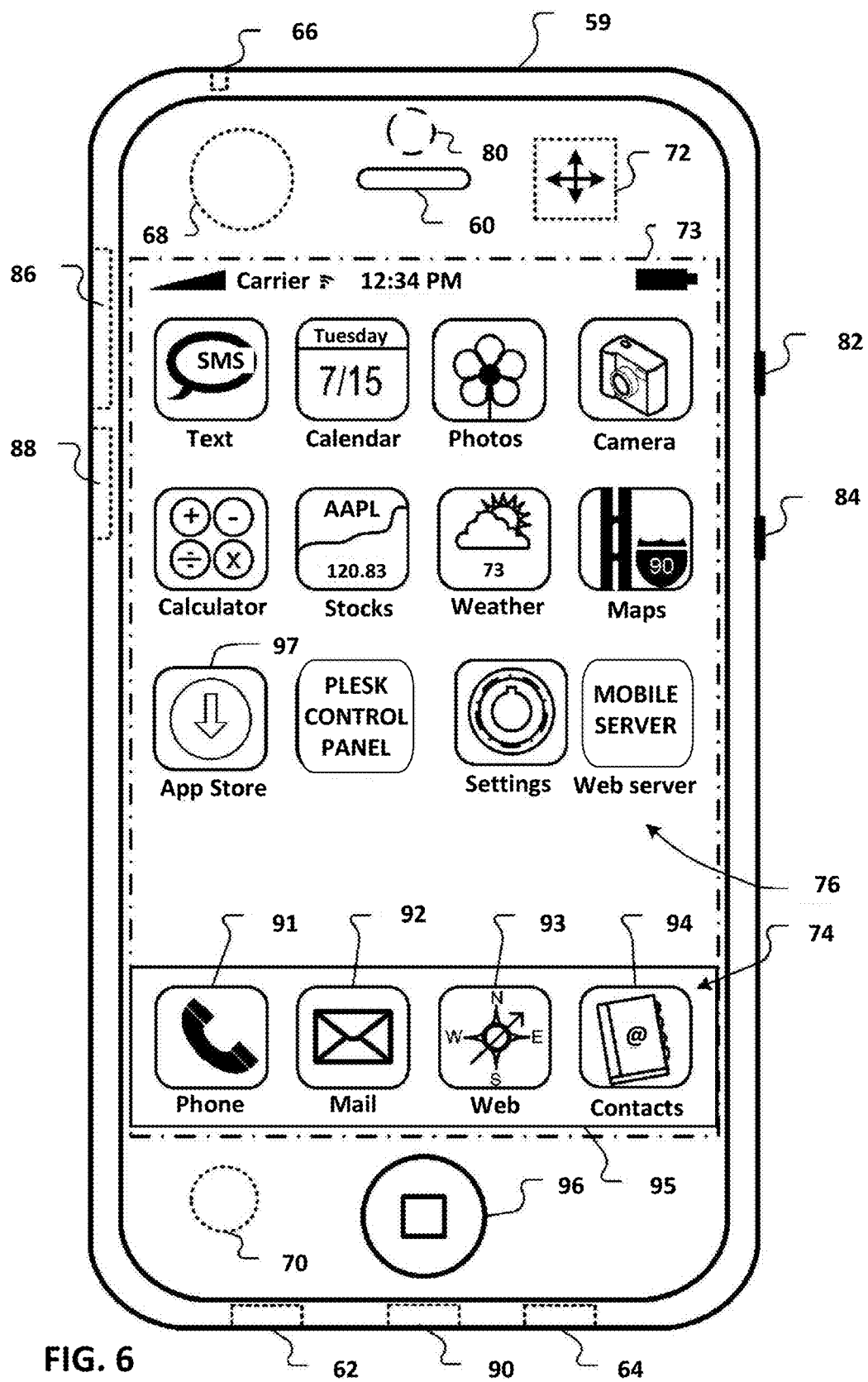
FIG. 6 is another illustration of the relationship between the components discussed in the present application.

FIG. 6 is another illustration of the relationship between the components discussed in the present application. As shown in FIG. 6, the mobile device 59 has some hardware components, such as GPS, network adapter, microphone, speakers and a camera. The mobile webserver 102 and the control panel 106 are stored and executing in a RAM, receiving requests and generating response, and both interface to a website 106 and a web application that generates the website 106 from a set of files provided to the webserver in order to generate the website 106.

The web application/website 106 interfaces to objects stored on the mobile device 59, such as photos, maps, music, video, context, text files, and so on. The web application generates a response to the request using the data from the mobile software. Note that frequently this data actually belongs to other applications (for example, a video application manages video data, a photo application manages image data, and so on), and therefore the owner of the website 106 (which is often the same as the owner of the mobile device 59) needs to grant permissions for the web application to access the data of other applications on the mobile device 59. This is normally done using the control panel 106 discussed above.

Figure 7:
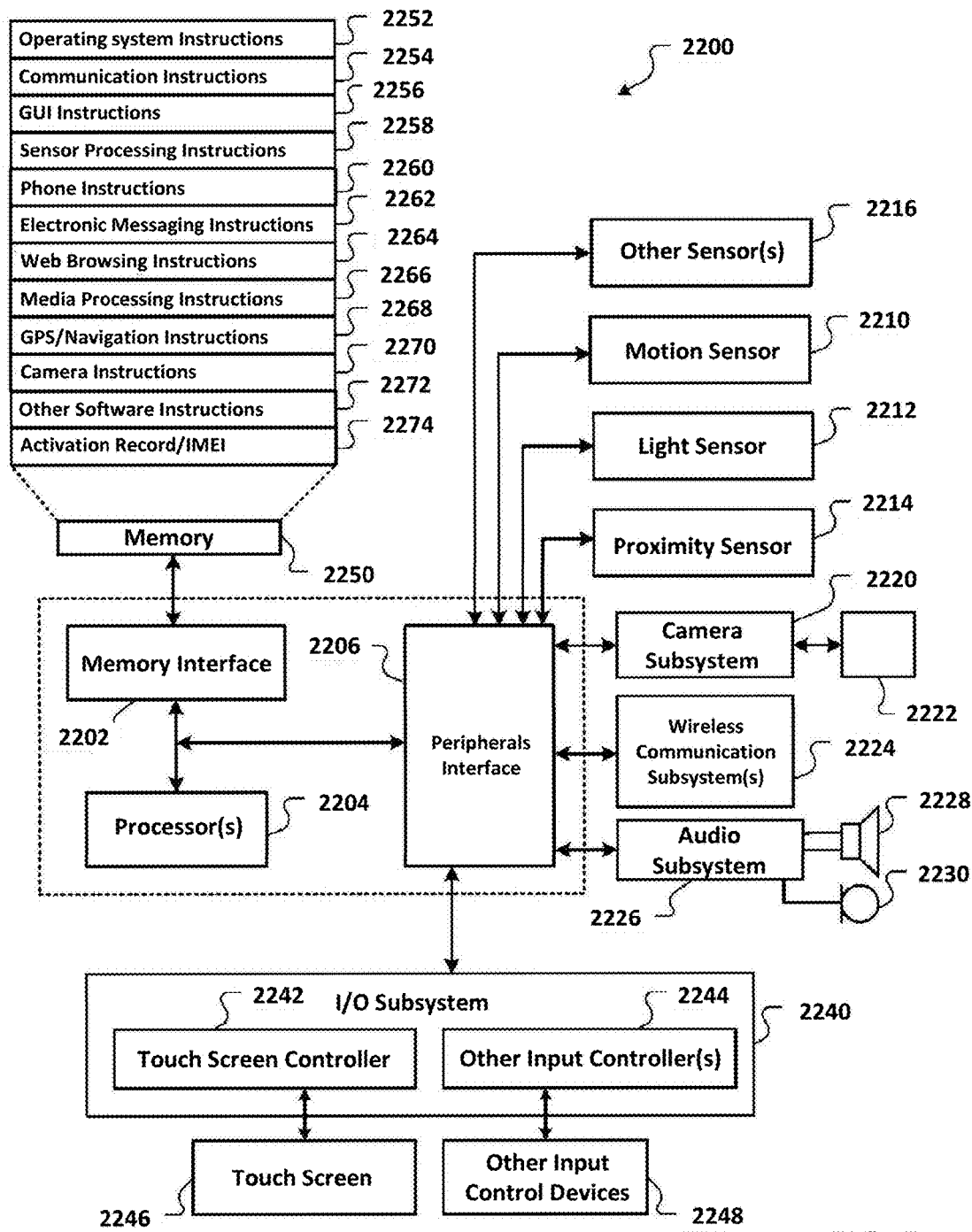
FIG. 7 is a block diagram of an exemplary mobile device that can be used in the invention.

FIG. 7 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, a tablet, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 8:
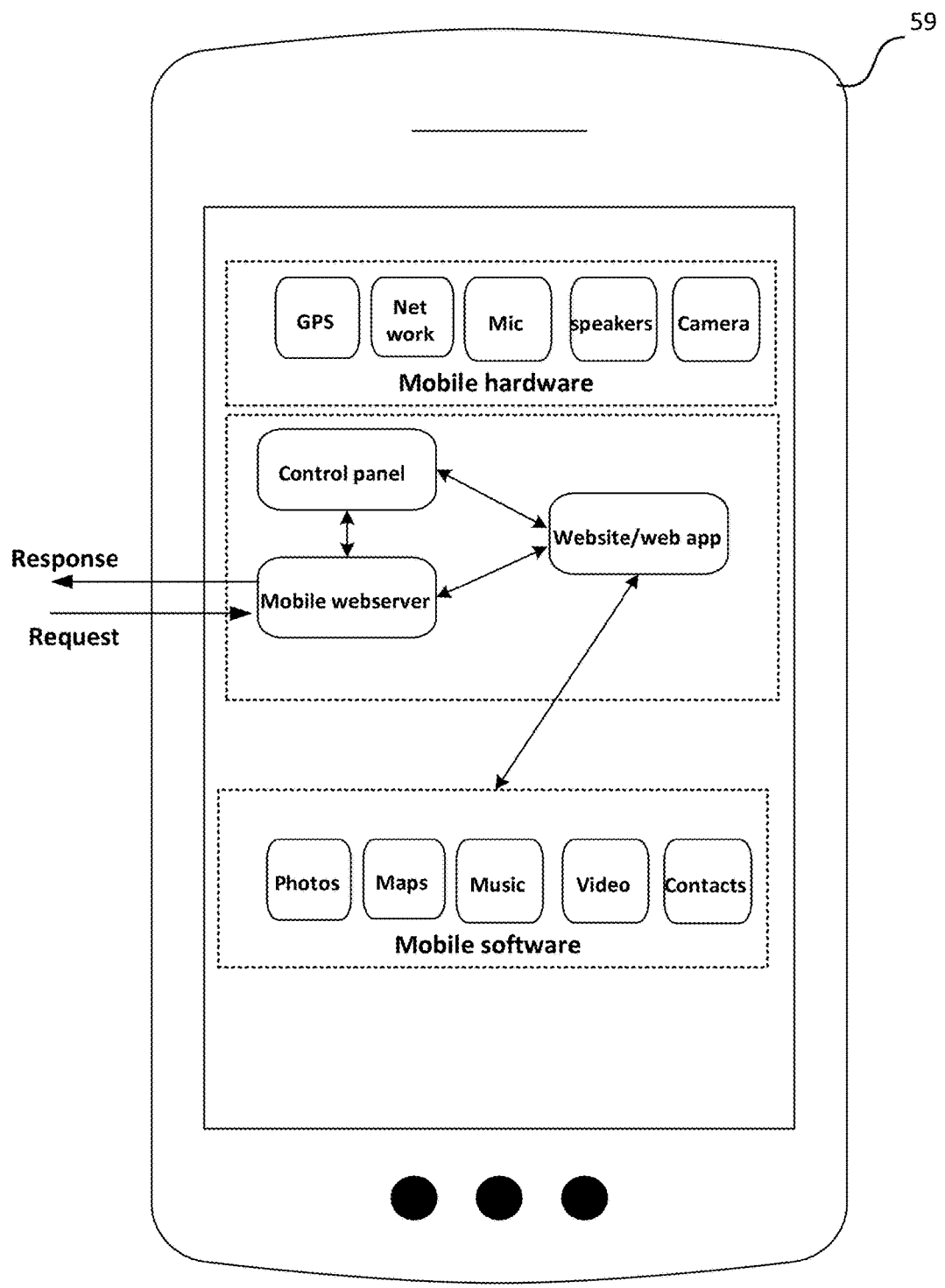
FIG. 8 is a block diagram of an exemplary implementation of the mobile device.

FIG. 8 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A system for hosting a website, comprising:
   a mobile device having an operating system and a supervisory component installed thereon;
   a webserver application running on the mobile device under control of the supervisory component;
   a control panel application running on the mobile device, the control application configured to set parameters of the webserver application; and
   wherein the webserver application is in a sleep mode and wakes up in response to a command from the supervisory component,
   wherein the webserver component generates a website using documents and files of other applications that are stored on the mobile device,
   wherein the supervisory component wakes the webserver application in response to an HTTP request received from a network port when the mobile device is connected to a mobile network, and
   wherein the webserver application is given permission to access the documents and files of the other applications through the control panel.

2. The system of claim 1, wherein the webserver application uses a static IP address assigned by a mobile provider.

3. A method for hosting a website, comprising:
   on a mobile device having an operating system and a supervisory component installed thereon, running a webserver application under control of the supervisory component;
   running a control panel application on the mobile device, the control application configured to set parameters of the webserver application,
   wherein the webserver application is in a sleep mode and wakes up in response to a command from the supervisory component;
   generating a website using documents and files of other applications that are stored on the mobile device;
   waking the webserver application in response to an HTTP request received from a network port when the mobile device is connected to a mobile network; and
   giving the webserver application permission to access the documents and files of the other applications through the control panel.

4. The method of claim 3, wherein the webserver application uses a static IP address assigned by a mobile provider.

* * * * *